United States Patent
Burke et al.

(10) Patent No.: US 7,246,607 B2
(45) Date of Patent: Jul. 24, 2007

(54) THREE POSITION FUEL LINE CHECK VALVE FOR RELIEF OF DIURNAL PRESSURE

(75) Inventors: David H. Burke, Victor, NY (US); William L. Villaire, Clio, MI (US); Dennis P. McGrath, Ortonville, MI (US); John G. Fischer, Goodrich, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/263,013

(22) Filed: Oct. 31, 2005

(65) Prior Publication Data

US 2007/0095330 A1    May 3, 2007

(51) Int. Cl.
*F02M 37/20*    (2006.01)

(52) U.S. Cl. ............ 123/516; 123/510; 123/495; 123/467; 137/517

(58) Field of Classification Search .......... 123/467, 123/516, 506; 137/517, 579, 479, 493.8
See application file for complete search history.

(56) References Cited

U.S. PATENT DOCUMENTS

| | | | | | |
|---|---|---|---|---|---|
| 3,664,368 | A | * | 5/1972 | Sweeney | 137/480 |
| 5,477,829 | A | * | 12/1995 | Hassinger et al. | 123/467 |
| 6,067,963 | A | * | 5/2000 | Oi et al. | 123/458 |
| 6,668,802 | B2 | * | 12/2003 | Kiowsky et al. | 123/467 |
| 6,988,488 | B2 | * | 1/2006 | Pursifull et al. | 123/467 |
| 7,066,152 | B2 | * | 6/2006 | Stroia et al. | 123/467 |

* cited by examiner

*Primary Examiner*—Stephen K. Cronin
*Assistant Examiner*—J. Page Hufty
(74) *Attorney, Agent, or Firm*—Paul L. Marshall

(57) ABSTRACT

Prior art fuel line check valves remain closed after engine off and cool down. Diurnal heating and the resultant pressure increase in the fuel line causes fuel vapor emissions through small openings in the fuel line (e.g., at the injector tips). The invention provides a check valve for a vehicle fuel line which opens in response to engine cooling and remains open while the engine is off to relieve subsequent increasing pressure in the fuel line due to diurnal heating thereof.

2 Claims, 2 Drawing Sheets

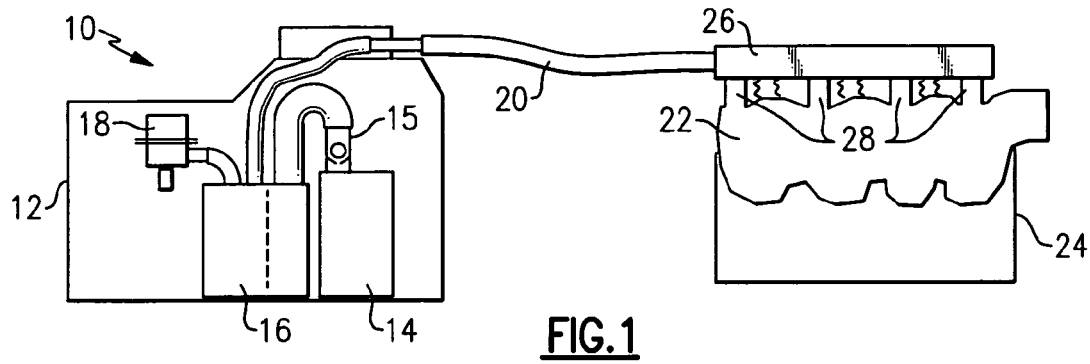
FIG.1
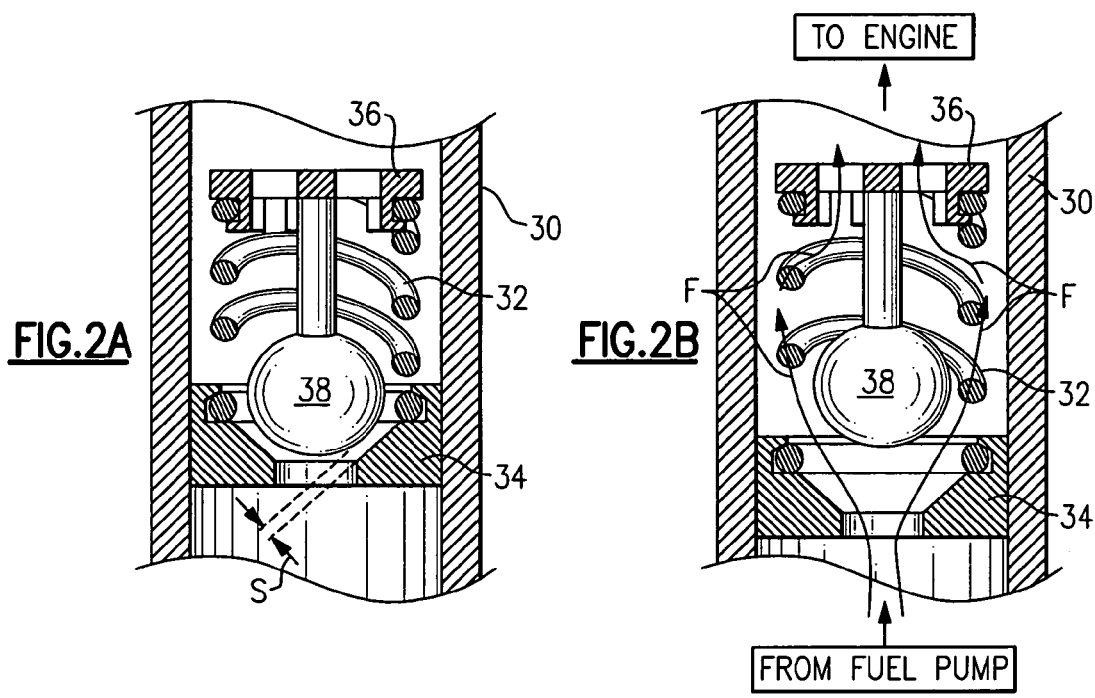
FIG.2A
FIG.2B
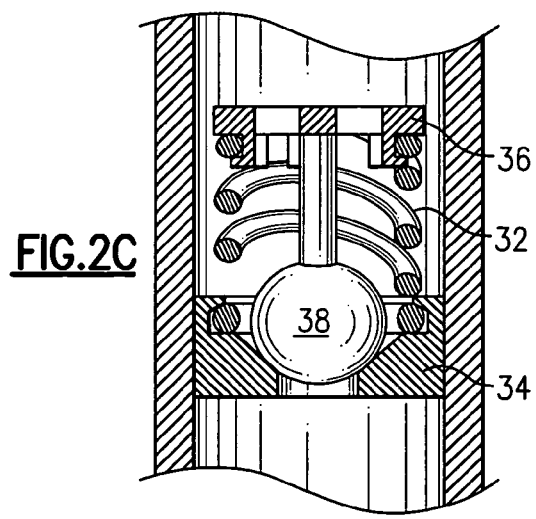
FIG.2C

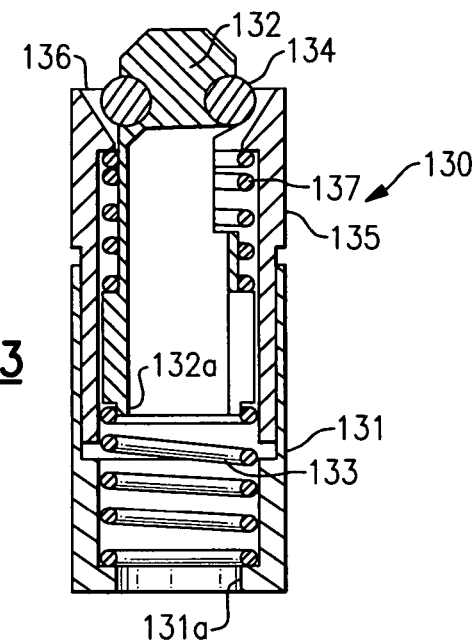
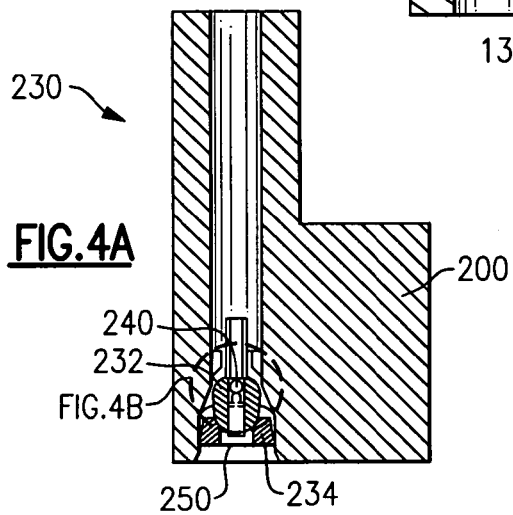
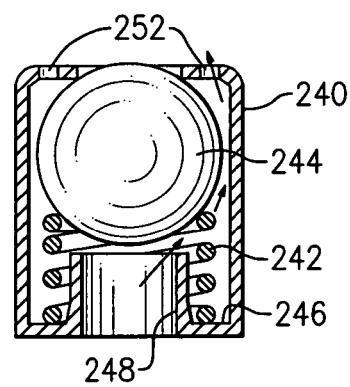
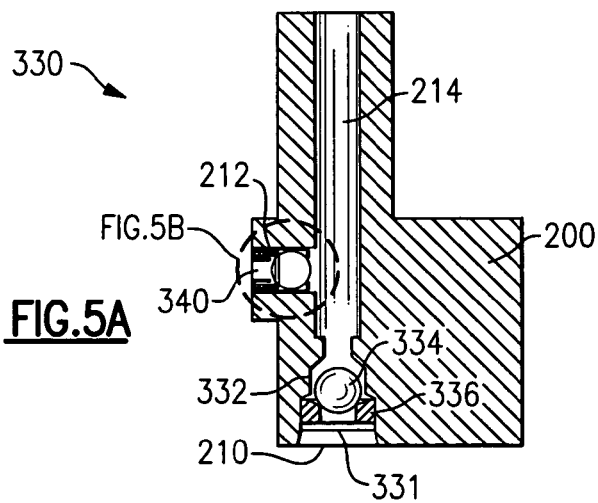
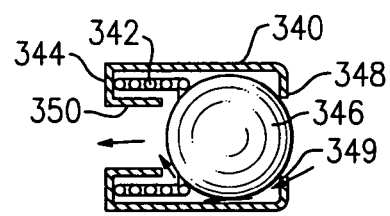

THREE POSITION FUEL LINE CHECK VALVE FOR RELIEF OF DIURNAL PRESSURE

TECHNICAL FIELD

The present invention relates to vehicle fuel line check valves and, more particularly, to a fuel line check valve that opens to relieve increasing fuel line pressure, and hence the escape of fuel vapors, caused by diurnal heating of the fuel line when the engine is not running.

BACKGROUND OF THE INVENTION

A vehicle fuel line system basically includes a fuel tank, a fuel pump and a fuel line that leads from the tank to the vehicle engine to deliver fuel thereto. A fuel regulator is used to maintain the proper amount of pressure in the fuel line and returns excess fuel to the fuel tank. Starting the engine also starts the fuel pump which pumps fuel from the tank and into the fuel line. Pressure builds in the fuel line to maintain the regulated amount of fuel running to the engine. In present day fuel line systems, a check valve that is normally closed is positioned in or near the fuel pump such that when the engine is turned off, the valve closes to maintain the pressure in the fuel line. This is done to prevent a rapid decrease in pressure which would result in boiling of the fuel in the fuel line due to the latent heat of the recently turned off engine. Should the fuel boil, fuel vapors would replace liquid fuel at the fuel injectors resulting in the engine being unable to start until the vapor is purged and replaced by liquid fuel at the injector tips.

While this method has worked well at preventing fuel boiling for this reason, a normally closed valve which remains closed even after engine cooling also undesirably prevents the relief of increasing pressure caused by diurnal heating of the fuel in the fuel lines (e.g., when the vehicle spends a cool night followed by a day without running and sitting in the hot sun). Thus, in a vehicle that has cooled down and then heated back up due to diurnal heating, fuel vapors may form that, due to the high pressure build-up in the fuel line caused by the heat and a normally closed valve, will leak out of the fuel line at seal locations such as the injector tips. While fuel vapor emissions due to diurnal heating have been tolerated in the past, present day federal and state emission regulations prohibit or at least significantly reduce previously accepted emission levels.

There therefore exists a need for a fuel line valve and method that will relieve pressure build-up caused by diurnal heating of a previously cooled engine, and thereby significantly reduce or eliminate fuel vapors from escaping the fuel line due to this phenomenon.

SUMMARY OF THE INVENTION

The present invention addresses the above need by providing a fuel line valve and method that is closed when the engine is initially turned off, opens once the engine has cooled, and remains open during subsequent diurnal heating of the off engine. More particularly, the invention provides a fuel line check valve system and method for reducing or eliminating fuel vapor emissions from a fuel line of an engine caused by diurnal heating. When the engine and fuel pump are running, the valve is open by the flow of fuel being pumped therethrough. When the engine (and hence also the fuel pump) is turned off, the valve immediately closes due to the high back pressure in the fuel line. This is desirable since the high back pressure will prevent the boiling of the fuel in the fuel line due to the hot engine. As the engine cools, the back pressure decreases until it reaches a threshold pressure that allows the valve to bias back to the open position. Should diurnal heating cause the fuel line temperature and pressure to increase, the open valve allows the release of this pressure so that vapors are not forced under pressure out of the fuel line and into the atmosphere. The threshold pressure at which the valve opens is set according to the specific fuel line system design and requirements. In one preferred embodiment, the pressure threshold is set to be about 25 kPa.

BRIEF DESCRIPTION OF THE DRAWINGS

The present invention will now be described, by way of example, with reference to the accompanying drawings, in which:

FIG. 1 is a schematic representation of a vehicle fuel line system;

FIG. 2A is an enlarged, cross-sectional view of a valve according to one embodiment of the present invention with the valve shown in the normally open, relaxed condition;

FIG. 2B is the view of FIG. 2A showing the valve in the extended open position;

FIG. 2C is the view of FIG. 2A showing the valve in the closed position;

FIG. 3 is an enlarged, cross-sectional view of a valve according to a second embodiment of the invention;

FIG. 4A is an enlarged, cross-sectional view of a valve according to a third embodiment of the invention;

FIG. 4B is an enlarged, fragmented view of the area of detail labeled 4B in FIG. 4A;

FIG. 5A an enlarged, cross-sectional view of a valve according to a fourth embodiment of the invention; and FIG. 5B is an enlarged, fragmented view of the area of detail labeled 5B in FIG. 5A.

DESCRIPTION OF THE PREFERRED EMBODIMENTS

Referring to FIG. 1, a typical vehicle fuel line system is designated generally by the reference numeral 10. A typical vehicle fuel line system basically includes a fuel tank 12, a fuel pump 14, a fuel filter 16, and a fuel regulator 18 with a fuel line 20 leading from the tank to the intake manifold 22 of the vehicle engine 24. Although a particular arrangement of the fuel line system is shown in FIG. 1, it is understood that the exact design and placement of fuel line components used with the present invention may vary according to the requirements of the vehicle application. In the system shown in FIG. 1, the fuel line 20 connects to a fuel rail 26 that has a plurality of fuel injectors 28 that are operable to deliver fuel into the intake manifold 22.

A fuel line check valve 30 according to a first embodiment of the invention is seen in FIGS. 2A-2C. Valve 30 is positioned in fluid communication with the fuel line between the pump 14 and intake manifold 22, preferably adjacent or in the fuel pump outlet 15 (see FIG. 1). Valve 30 is a spring biased ball valve which is biased in the open position seen in FIG. 2A. At rest with no forces acting thereon, valve spring 32, which is connected to and between valve seat 34 and valve plate 36, biases ball 38 in spaced relation to the valve seat 34. An opening having a spacing "S" is thus created about the circumference of valve ball 38 in the normally open, unbiased condition of valve 30.

FIG. 2B shows valve 30 in the extended open position which occurs when the engine and fuel pump 14 are running and fuel is flowing through valve 30 as indicated by the arrows "F". The force of the fuel F flowing through the valve causes the spring 32 to extend which increases the original spacing S between the ball 38 and valve seat 34.

FIG. 2C shows valve 30 in the biased closed position which occurs when the pressure in the fuel line downstream of the valve (toward engine 24) is a predetermined amount higher than the pressure upstream of the valve (toward pump 14). The pressure differential that occurs immediately after the engine is shut off is sufficient to cause the valve 30 to close as seen in FIG. 2C. This will maintain the pressure in the downstream line 20 until the engine begins to cool. Maintaining the pressure for this period of time is desirable since the pressure prevents the boiling of the fuel in the downstream fuel line 20 due to the heat of the recently turned off engine. As the engine cools, the pressure in the downstream fuel line 20 lowers. At the valve opening pressure (e.g., about 25 kPa), valve 30 will open to the unbiased, relaxed position seen in FIG. 2A and the upstream and downstream pressures will move toward a state of equilibrium. Conversely and as discussed above, prior art fuel line valves are biased to remain closed, even after engine cooling. When the pressure in the fuel line begins to build back up due to diurnal heating, fuel vapors are forced out of any tiny openings in the fuel line system (e.g., at part interfaces of the fuel injectors). As explained, these vapor emissions are undesirable and are significantly reduced or eliminated with the present invention wherein the check valve is biased in the open position seen in FIG. 2A. As such, diurnal heating and rising pressure in the downstream fuel line 20 will be relieved at spacing S of open check valve 30 which thus allows movement toward pressure equilibrium despite rising temperature of the downstream fuel line 20. Fuel vapors will therefore not be forced out tiny openings in the fuel line system as is the case with the prior art, normally closed check valves.

FIGS. 3-5B show several alternate embodiments of the inventive valve. In FIG. 3, a prior art normally closed valve has been modified to a normally open valve 130. In particular, a lower valve sleeve 131 including a second spring 133 is has been attached to the upper valve sleeve 135. The second spring 133 is positioned between lower flange 131a and the base 132a of the pintle 132. An O-ring 134 at the opposite end of the pintle is positioned to open and close with respect to valve seat 136. Second spring 133 is sufficient to overcome the opposite (closing) bias of first spring 137 and thus biases valve 130 to the normally open position as shown. This embodiment thus shows how a normally closed check valve can be retrofitted to become a normally open check valve.

FIGS. 4A and B show another embodiment of the invention designated generally by the reference numeral 230 wherein a prior art, primary check valve 232 is positioned in the fuel pump end cap 200. When fuel is flowing through the pump, primary check valve lifts off seat 234 and is open. When the engine and fuel pump are turned off, the high back pressure in the downstream fuel line causes primary check valve to move against valve seat 234 and close. The invention provides a secondary valve 240 positioned inside the primary check valve 232. As seen best in FIG. 4B, secondary valve 240 includes a spring 242 extending between a ball 244 and flange 246 which surrounds passageway 248 that is in fluid communication with primary valve inlet 250. When the fuel pump is on and fuel is flowing, the primary and secondary valves 230, 240 are both open and fuel may flow through and out openings 252 in valve 240. When the engine and fuel pump are turned off, primary valve 230 closes as explained above and secondary valve 240 also closes by ball 244 being forced against the bias of spring 242 to seat on smaller diameter opening 248. As the engine and fuel line cool down and pressure in the downstream fuel line decreases, the bias of spring 242 will act against ball 244 which will unseat itself from opening 248, thereby allowing the downstream pressure to be relieved. As such, fuel vapors will not be trapped and forced out of tiny openings in the downstream fuel line as explained above.

FIGS. 5A and 5B show yet another embodiment of the invention wherein a prior art ball check valve 330 is positioned at inlet 210 of fuel pump end cap 200. Valve 330 has a valve head in the form of a ball 334. When the fuel pump is on and fuel is flowing therethrough, ball 334 unseats itself from valve seat 336 and the valve is thus open. Upon turning the engine and fuel pump off, the backpressure in the upstream fuel line causes ball 334 to move against valve seat 336 and close the valve. The invention provides a secondary valve 340 positioned in an opening 212 extending radially outward of the pump end cap outlet 214. As seen best in FIG. 5B, secondary valve 340 includes a spring 342 extending between flange 344 and ball 346. Spring 342 biases ball 346 against flange 348 which includes one or more through holes 349 making valve 340 normally open. When the fuel pump is on and fuel is flowing through primary valve 332, secondary valve 340 closes since it is located radially outward of the fuel path through pump outlet 214. When the engine and fuel pump are turned off, the high backpressure in the upstream fuel line will close primary valve 332 and also secondary valve 340 by the back pressure causing ball 346 to move against the bias of spring 342 and seat against valve outlet 350. As the engine cools and the pressure in the upstream fuel line lowers, the force of the ball against spring 342 is lowered such that the spring starts biasing ball 346 in the opposite direction, i.e., toward valve flange 348. When the ball 346 is seated against valve flange 348, upstream pressure caused by diurnal heating may be relieved through openings 349.

It is noted that in the embodiments of FIGS. 4A-5B, the valves 230 and 330 are of higher flow restriction than valves 30 and 130 due to small openings 252, 349, in valves 230, 330, respectively. This design not only aids in the closing of the valve upon shutting the engine off, but also impedes siphoning of fuel from the fuel tank in the event of the downstream fuel line being severed (with resultant rapid decrease in pressure) in a collision, for example.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims

What is claimed is:

1. A valve for use in a vehicle fuel line extending between a fuel pump and engine, said valve including a spring biasing said valve in the open position, said spring bias being of a force that:
   a) opens said valve to a first valve position in response to fuel flowing therethough by action of said pump;
   b) while the spring is in compression, closes said valve to a second valve position in response to the force of the fuel line pressure at the time of the engine and fuel pump being turned off;

c) reopens said valve to a third valve position upon cooling of the engine and resultant lowering of the fuel line pressure at or below a predetermined threshold pressure; and d) maintains said valve open in said third valve position during diurnal heating and resultant pressure increase in the fuel line, said open valve operating to relieve the diurnal heating pressure increase in the fuel line, wherein said third valve position is in between said first and second valve positions.

2. The valve of claim 1, wherein said predetermined threshold pressure is about 25 kPa.

* * * * *